Figure 3:
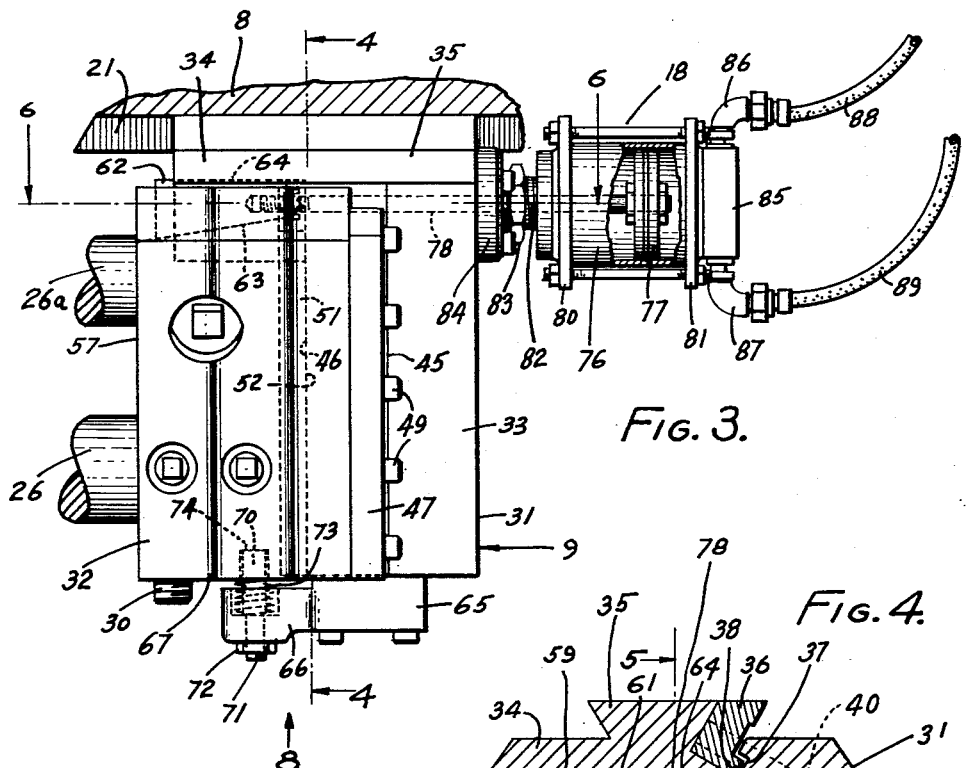

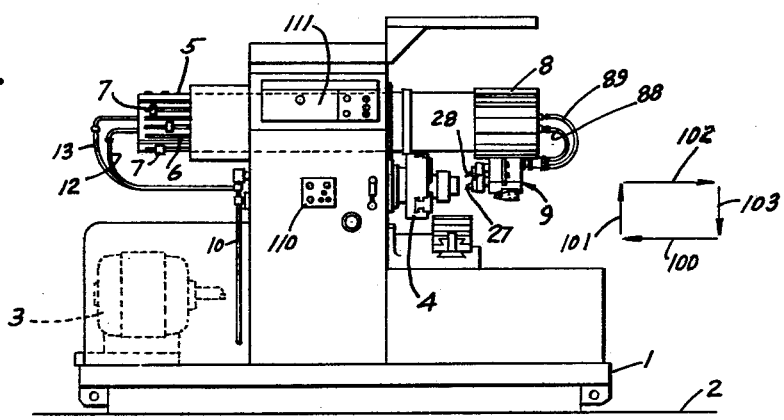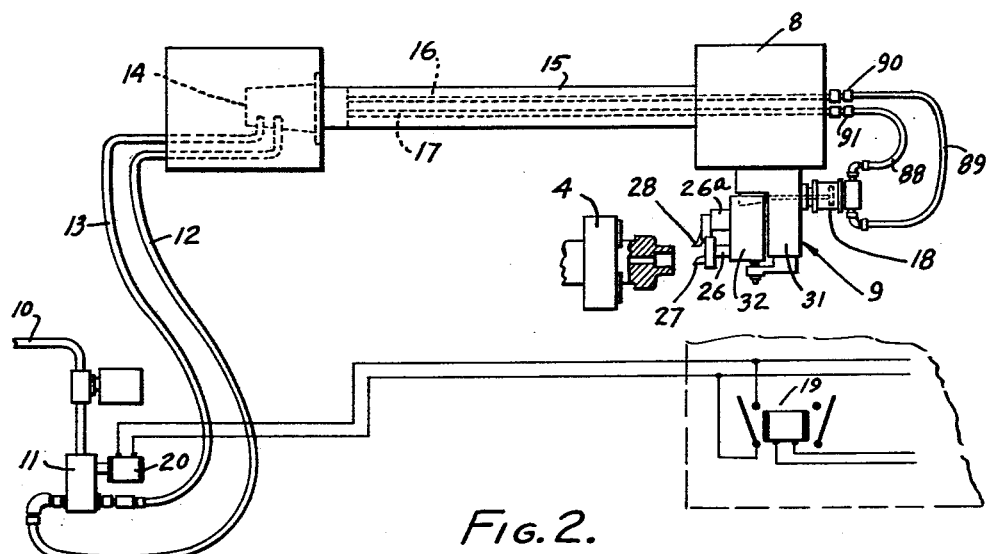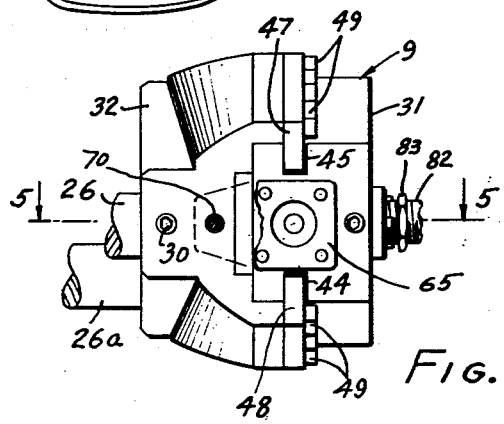

INVENTOR.
MARTIN CHRISTENSEN
BY
ATTORNEY

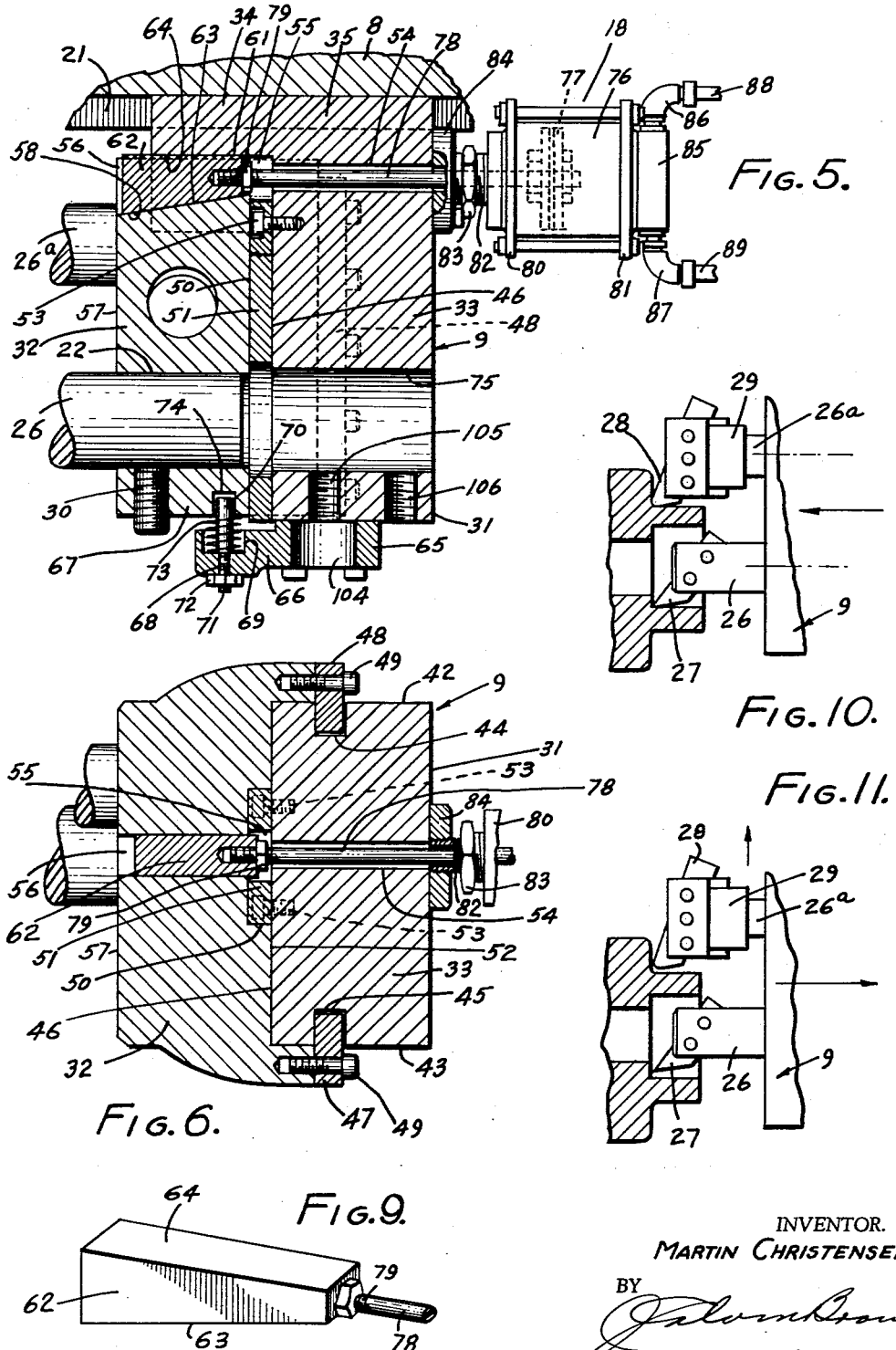

United States Patent Office 3,010,344
Patented Nov. 28, 1961

3,010,344
LATHES
Martin Christensen, 1329 W. 30th St., Gardena, Calif.
Filed Nov. 25, 1957, Ser. No. 698,610
3 Claims. (Cl. 77—3)

The present invention relates broadly to improvements in lathes, and more specifically to improvements in what are known as automatic lathes.

As is generally known, tooling requires that bores and cuts be made in the work, perhaps at successive stations, until the cut surface has been brought to required dimension and finish. Thus, the cutters are constantly fed forwardly as the work is rotated, followed by a withdrawal of the cutters from the work. When cutter withdrawal occurs during spindle rotation with the cutter contacting the work, a spiral mark is made on the finished surface of the work. If rotation of the spindle is stopped, then a straight tool withdrawal mark will be made by the cutter on the finished surface of the work. Generally, finished work that has a withdrawal mark upon its finished surface is undesirable and likewise unacceptable in certain industries where the work must be within certain tolerances. This is particularly true in the aircraft industry.

An object of the present invention is to provide means whereby cutter withdrawal marks on a finished surface are prevented by simple, efficient, time saving, economical means and without complex changes in lathe construction.

An object is the provision of means for preventing cutter withdrawal marks on a finished surface of work when a lathe is operated either automatically or under hand control.

An object of the invention is the provision of mechanism which functions to bring cutters into cutting engagement with work and upon the completion of a cutting operation, to automatically move radially from the work prior to withdrawal of the cutters from the work, whereby cutter withdrawal marks do not appear upon the finished surface of the work.

An object of the invention is to effect a time saving in the cutting by and withdrawing of cutters from work.

With the above mentioned and other objects in view, the invention consists in the novel and useful provision, formation, construction, and relative arrangement of parts, members, and features, all as disclosed in a certain embodiment in the accompanying drawings, described generally, and more particularly pointed out in the claims.

Figure 4:
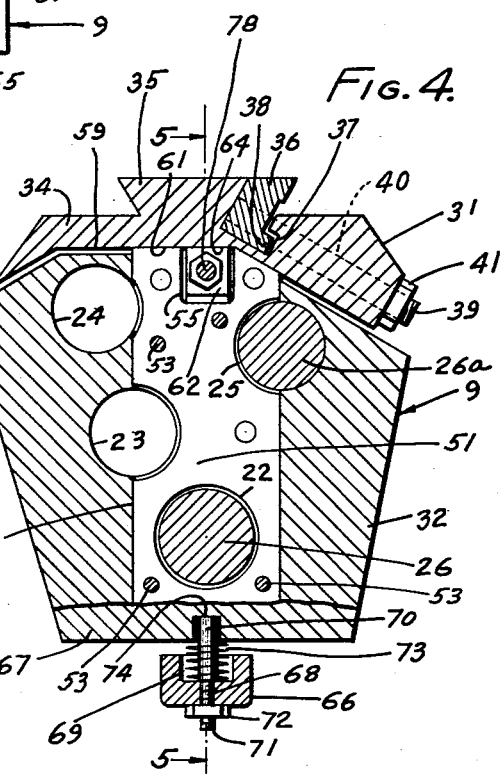
Figure 7:
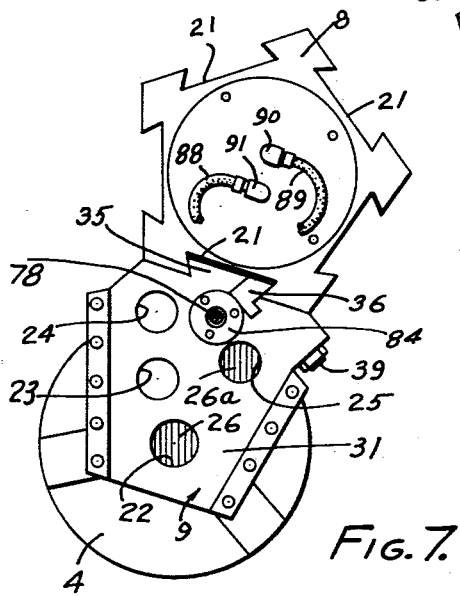

In the drawings:

FIGURE 1 is a side elevation of an automatic chucking lathe incorporating the invention, FIGURE 2 is a fragmentary view, partly in section, showing certain elements entering into the invention, and the controls therefor, FIGURE 3 is a fragmentary, partially sectional view, in side elevation, of the invention, FIGURE 4 is a sectional view on the line 4—4 of FIGURE 3, FIGURE 5 is a fragmentary sectional view on the line 5—5 of FIGURE 8, FIGURE 6 is a fragmentary sectional view on the line 6—6 of FIGURE 3, FIGURE 7 is an end elevation of a turret head assembly which incorporates the present invention, FIGURE 8 is a fragmentary, partially sectional view of certain apparatus of the invention, and looking in the direction of the arrow 8 of FIGURE 3, FIGURE 9 is a fragmentary perspective view of a wedge or cam element utilized in the invention, FIGURE 10 is a fragmentary perspective view showing cutters engaging work during a cutting operation, FIGURE 11 is a view similar to FIGURE 10, the cutters being raised from the work surface prior to withdrawal of said cutters from the work and return to initial cutting position, and FIGURE 12 is a fragmentary perspective view of work showing spiral cutter withdraw marks on the finished surfaces thereof.

Referring now to the drawings, I have shown, in FIGURE 1, certain essential elements of a turret lathe of a type which may incorporate the present invention. The lathe includes the usual base member 1 which is secured to a foundation 2, such as a flooring, in any approved manner, together with framing which is mounted upon the platform 1 and supports an enclosing casing for elements of the lathe. I refer to the motor, shown at 3, which functions to drive the spindle for chuck 4, with a control drum at 5 which is slotted longitudinally, as shown at 6, with adjustable trips 7 in said slots for controlling the automatic operation of the lathe. A turret is provided at 8, which turret may be of the pentagonal type, and which secures various and sundry turning heads, one of which is shown at 9. The turning head is also called a tool holder. Most of the apparatus is electro-pneumatically controlled, and to this end, an air control panel is shown at 110, and a main control panel at 111. While no particular type of turret lathe is contemplated, the lathe shown in FIGURE 1 is representative of a lathe manufactured by Warner & Swasey, and known as the "2 A.C. Single Spindle Automatic Chucking." Lathes of this character are adapted to be electro-pneumatically controlled for the automatic rotation and feeding of the turret, with the feeding under control of the adjustable trips shown at 7. Such controls are many and varied and are well understood by those skilled in the art to which this invention is directed, and include indexing, dwell selector, cycle stops, reverse feed or spindle stop and spindle release, and many others, which do not enter into the present invention. Thus, referring to FIGURE 2, the present invention taps into the main pressure air supply, indicated at 10, through a two-way solenoid controlled valve 11. Flexible hoses 12 and 13 connect with the outlets from said two-way solenoid valve, and with a swivel joint 14. A pipe 15 extends between the turret 8 and casing joined to the turret, as shown in FIGURE 1, and with a casing adjacent the control drum 5. Elongated tubes 16 and 17 are passed through the pipe 15, and the said turret, and communicate with an air motor 18. This air motor is carried by the tool holder or turning head 9.

The air motor 18, when actuated in one direction, positions the cutter tools for engagement with work during movement of the turret, and removes the cutter tools from work engagement at the end of the cutting stroke. The traverse of the turret is, of course, automatically or manually regulated by the operator. The control circuit for bringing the cutter tools into position for cutting engagement with work and the release thereof from the work is indicated at 19, in FIGURE 2, and comprises, in the present instance, a rapid traverse relay which controls operation of the solenoid 20 of the solenoid actuated valve 11. Hence, adjustment of the various controls of the lathe are such as to select the feeds, spindle speeds, and length of cutting stroke and, at the same time, so actuate the cutters carried by the turning head or tool holder that said cutters are in position to engage the work for a cutting operation when the chuck is rotating, to lift said cutters radially from the work at the end of the cutting stroke as shown, for instance, in FIGURE 11, and to move the turning head or tool holder to a return cutting position, followed by lowering the cutters to work engaging position. Simply explained, the cutter blades have a rectangular movement, to-wit: in, up, return, and down. As stated, all of this is accomplished by utilizing the controls already present in a lathe of the type shown, with the addition of the two-way solenoid valve and its connection with the air motor 18.

The pentagonal turret has five stations, in the present instance, as shown in FIGURE 7, and the said turret 8 is provided with dove-tail grooves which extend parallel with the turning axis thereof, as shown at 21, for each station. These dove-tail grooves are adapted to carry the turning heads or tool holders, one of which is shown at 9. Any number of tool holders may be secured to the turret and, as the lathe shown is automatic in operation, the turret is also rotated automatically to bring the various stations into position for use of the various turning heads or tool holders in accordance with the work being operated upon. However, I have only shown one turning head or tool holder. Thus, in said showing, the spindle of the chuck 4 is in axial alignment with one bore 22 of said tool holder, this bore usually accommodating a boring tool of some character, such as a drill, while other bores are shown at 23, 24 and 25. In the present embodiment of the invention, cutter holders 26 and 26a are secured in the bores 22 and 25, which holders carry cutters 27 and 28, as shown in FIGURES 10 and 11. The cutter 28 is carried by an adjustable angle holder 29. The cutter holder shanks are adjustably carried within the bores of the turning head or tool holder and held in their adjusted position by means of one or more set screws, as illustrated in FIGURE 5, at 30.

Referring to FIGURE 2, the turning head or tool holder 9 of the invention has a fixed portion 31 and a movable portion 32, which carries the cutters. The fixed portion is carried by the turret 8.

Reference is made to FIGURES 4, 5 and 6 in describing the construction of the turning head or tool holder 9. The fixed portion 31 is termed the saddle, and the movable portion 32 the slide and, as shown in FIGURE 5, the saddle in vertical cross section has the appearance of an inverted L, one portion of the saddle being designated as 33, and the second portion as 34, for ease of description. The portion 34 is formed for connection with the turret 8 by providing the top wall of the portion 34 with a dove-tail tongue 35, which extends lengthwise thereof (see FIGURE 4). The dove-tail tongue 35 is of reduced width and the portion 34 is grooved to receive an elongated gib 36 to bring the dove-tail portion to a certain width. Portion 34 is likewise undercut at 37 to receive a base flange 38 formed on the gib, the construction being such, due to spacing of the transverse dimension of the gib relative to the groove in the member 34 that transverse movement of the gib may be effected. The dove-tail portion 35 plus the gib 36 will fit within the dove-tail groove 21 of the turret so as to permit slide movement therein. In order to lock the turning head in adjusted position in the turret and within a dove-tail groove thereof, locking bolts 39, of which there may be a plurality, are passed through bores 40 in portion 34 and are secured to the gib so that upon turning a nut 41, carried by each locking bolt, separation is effected between the gib and tongue 35 to cause tight engagement with a wall bounding the dove-tail groove of the turret, and thus effectively lock the dove-tail tongue and gib within the said dove-tail groove. As shown in FIGURE 6, the portion 33 of the saddle is substantially rectangular in cross section, with opposite parallel end walls 42 and 43 provided with aligned parallel grooves 44 and 45. The slide 32 is substantially, in vertical cross section, a polygon while in transverse horizontal section, the side walls are slightly curved, as shown in FIGURE 6. Such sections are arbitrary and other sections may be utilized, as is self evident. The face of the slide contiguous to the saddle is formed with an elongated groove 46 for reception therein of a portion of the said saddle, as shown in FIGURE 6. Gibs are carrier by the slide, at 47 and 48, being secured to the slide by means of screws, designated generally as 49, received in threaded openings of the slide, the said gibs extending into the grooves 44 and 45 for guiding movement of the slide relative to the saddle. The said slide is provided with a groove 50 which is intermediate the sides bounding the groove 46 and groove 50 accommodates therein a substantially rectangular plate 51, the front face of said plate being flush with the base 52 bounding groove 46. Plate 51 functions as a key and is provided with transverse bores for accommodating screws 53 threaded into the saddle 31. Thus, the saddle and slide are held in juxtaposition and in relative movable relationship by the gibs and the said key, affording a close working fit between the saddle and slide. Intermediate the ends 42 and 43 of the saddle, the said saddle is provided with a transverse bore 54, and the key 51 is provided with an enlarged bore 55 in axial alignment with the bore 54. The slide is provided with a transverse groove 56 in alignment with the said bores 54 and 55. The base wall bounding groove 56 is inclined downwardly from face 52 to the outer face 57 of the slide, as shown at 58. This base wall 58 acts as a cam face, as hereinafter set forth.

As shown in FIGURE 4, the horizontal portion 34 of saddle 31 is adapted to spacedly overlie the top of the slide 32, and the base surface 59 of portion 34 generally conforms to the geometric configuration of the top 60 of the slide. The top edge 61 of the key likewise conforms to the geometric configuration as shown. Such a spacing between the saddle and the slide is, of course, necessary in order that the slide may move relative to the saddle, and this movement is afforded by means of a wedge or cam member 62, which has its cam face 63 at an angle corresponding to the angle of cam face 58 in the slide. The face opposite the cam face, to wit, 64, abuts a portion of the base surface 59 of the saddle and, as a consequence, movement of the wedge or cam will cause movement of the slide in one of two directions relative to the saddle. Such movement is under the control of a stop pin assembly. This assembly includes a bracket 65 secured to the base of portion 33 of the saddle, by screws, bolts, or other devices.

The bracket 65 is provided with an extension 66 which underlies the base 67 of the slide, and the said extension 66 of the bracket is provided with a bore 68 and a counter bore 69. The wall bounding bore 68 is threaded. A pin 70 has a threaded portion 71 in engagement with threaded bore 68. The pin is adjustable as to its extension above the bracket and locked in position by a lock nut 72 carried on the threaded area of the said pin. Positioned within the counter bore and surrounding the said pin is a coil spring 73. This coil spring extends outwardly of the counter bore and engages the base 67 of the slide, and constantly urges the slide upwardly, the spring being of sufficient strentgh to overcome the weight of the slide and any associated tools carried thereby. The purpose is, of course, to move the slide downwardly when the wedge or cam 62 moves inwardly toward the saddle to compress the spring and to force the slide upwardly relative to the said saddle when the wedge moves away from the saddle. The slide is bored inwardly from the base 67, at 74, to receive the pin 70, and it will be noted in FIGURE 5 that the upper end of the pin is spaced slightly from the end of the bore. Thus, as the wedge moves inwardly upon the cam face 63 of the slide to move the slide downwardly, a position will be reached where the upper end of the pin 70 engages the wall bounding the end of the bore to limit further downward slide movement. The degree of movement permitted the slide will depend upon regulation of the pin height.

Before describing the means for effecting movement of the wedge 62, attention is called to the fact that the slide is provided with a series of transverse bores which have heretofore been referred to in FIGURE 7, at 23, 24, 25 and 26. These bores accommodate the cutter holders which carry the cutters, as illustrated in FIGURES 10 and 11, with said holders locked within said bores by set screws such as shown at 30 in FIGURE 5, whereby movement of the slide carries with it the said holders. As shown in FIGURE 4, the key 51 has bores which are aligned with the bores of the slide, and these said bores which, in certain instances, are small arcs instead of complete circles, are of greater diameter than the diameter of the bores in said slide. If the ends of the holders, such as shown for the holder 26 in FIGURE 5 should extend beyond the end of the bore in the slide, movement of the slide would still be permitted relative to the saddle. It is also seen that the saddle may be provided with transverse bores, such as shown in FIGURE 5 for one bore at 75, the said bore being in alignment with the bore at 22.

The air motor 18 includes a cylinder 76 within which is a piston 77 to which is attached an elongated stem 78, threaded at one end 79 for threaded engagement with the wedge 62. A lock nut is carried on the threaded area of the stem, as shown. The cylinder 76 has two heads 80 and 81, the head 80 having a threaded gland fitting 82 for connection by a threaded nut 83 to an enlargement 84 on the saddle 31. This enlargement is bored to align with the bore 54. The head 81 has a portion 85 carrying end fittings 86 and 87, the fittings securing ends of flexible hoses 88 and 89 respectively, which hoses, through additional couplings at 90 and 91, connect with the pipes 16 and 17. The arrangement is such that pressure air is admitted to one or the other hoses and directed to a side of the piston to cause movement thereof. Thus, assuming that hose 13 is in communication with pipe 16, hose 89, member 85, and a duct within the cylinder, pressure air will be directed to the left hand side of piston 77, viewing FIGURE 5. The piston would then be moved to the right, under air pressure, while if air is directed through the hose 88, this air under pressure will be on the right hand side of the piston and, therefore, move the piston to the left. All relief of air pressure occurs in the valve 11, so that air is exhausted from one side of the piston when pressure is applied to the opposite side. Normally, the solenoid 20 is in open position.

The operation, uses, and advantages of the invention just described, are as follows:

I assume that the cutting tools have been properly set up as, for instance, illustrated in FIGURES 10 and 11, and that the cutter angles have been determined for the particular work, as well as the stroke to be made by the turret during a cutting operation. I also assume that the stop pin 70 has been adjusted so as to regulate the depth of cut to be made by the cutters. When the lathe commences automatic operation, the turret will move toward the work, bringing the cutters from the position shown in FIGURE 1 toward the said work in the direction of the arrow at one side of FIGURE 1, and indicated as 100. The cutters will then engage the work in the manner shown in FIGURE 10 to perform a cutting operation. Pressure air has previously been admitted automatically to the cylinder 76 to move the piston 77 from the position of FIGURE 5 to that of FIGURE 3, to move the slide downwardly against the preset stop pin 70, as shown in FIGURE 3. This, of course, positions the depth of cut by the cutters 27 and 28 and pressure air is maintained within the cylinder to hold the piston in the position of FIGURE 3 during said cutter operation. When the desired cut has been completed, air is bled from the left side of the piston, shown in FIGURE 3, while pressure air is admitted to the opposite side of the piston to move the wedge. The slide is moved upwardly by springs 73 and the parts assume the position shown in FIGURE 5. Ordinarily, the angle of the cam faces 58 and 63 is such as to require some assistance to move the wedge, and for this reason, it is preferable to apply air under pressure to the opposite side of the piston while bleeding air from the cylinder. In any event, the operation is substantially instantaneous, and the cutters, upon such pressure release and slide actuation by the spring, move from the position shown in FIGURE 10 radially, as indicated by the arrow 101 in FIGURE 1, so as to be out of contact with the surface just cut on the work, to the position shown in FIGURE 11, immediately followed by a retrograde movement, as indicated by arrow 102 (FIGURE 1), of the cutters as the turret 8 moves automatically away from the work. Upon completion of the retrograde movement or stroke of the turret, the cylinder 76 is again pressurized to move the wedge 62 from the position shown in FIGURE 5 back to that of FIGURE 3, which moves the slide in the direction of the arrow 103 in FIGURE 1, so that the cutters are ready for work engagement when the turret automatically moves toward said work. The present device effectively overcomes any spiraling or other marks upon the finished surface of the work, as shown in FIGURE 12, and the degree of movement of the cutters from the work may be slight and just sufficient to clear the work.

In FIGURE 5, it may be mentioned that the bracket 65 is provided with an enlarged bore at 104 so as to permit access to a threaded bore 105 which communicates with bore 75. There is also a threaded bore at 106, and these threaded bores are adapted to receive locking screws of the type shown at 30, for the securing of cutter drills within the bores.

I have illustrated a structure which, due to its method of fabrication, is rigid and effectively holds the slide to the saddle without play and still allows movement of the slide, and further, a structure which may be easily connected to the main control lines for automatically operating the lathe.

I claim:

1. In an automatic lathe, mechanism for preventing cutter withdrawal marks, comprising a supporting member, a slide vertically movable with respect to said member, a boring tool carried by the slide, an extension of the supporting member overhanging the slide, a camming wedge engaging both the extension and the slide, means for reciprocating the wedge horizontally to move the slide downwardly to bring the boring tool to working position as the wedge moves in one direction, an adjustably mounted pin lying in the path of movement of the slide to limit downward movement of the slide, and means urging the slide upwardly against the wedge, whereby as the wedge is moved in the opposite direction the slide is elevated bringing the boring tool out of contact with the work.

2. The mechanism of claim 1 in which the urging means is a spring proximate the stop member.

3. The mechanism of claim 1 in which the supporting member is an inverted L-shaped turning head movably carried by a turret, the extension being the horizontal bottom leg of the L and the lower portion of the supporting member corresponding to the vertical stem of the L being rectangular in horizontal cross-section and having vertical grooves in both sides, guiding gibs carried by the slide and extending into said grooves, a centrally positioned key plate having a hole larger in diameter than the shank of the boring tool to allow for the up and down movement of the slide, the wedge having a horizontal face engaging the extension of the supporting member and movement of the wedge being controlled by a piston having a rod parallel to said horizontal face of the wedge.

References Cited in the file of this patent

UNITED STATES PATENTS

| | | |
|---|---|---|
| 2,179,573 | Criddle | Nov. 14, 1939 |
| 2,263,085 | Guild | Nov. 18, 1941 |
| 2,412,038 | Freisen | Dec. 3, 1946 |
| 2,560,686 | Curtis | July 17, 1951 |
| 2,637,237 | Montgomery | May 5, 1953 |
| 2,657,066 | Boyd | Oct. 27, 1953 |
| 2,690,608 | Rice | Oct. 5, 1954 |
| 2,800,041 | Sten | July 23, 1957 |
| 2,816,767 | Pekrul | Dec. 17, 1957 |
| 2,832,248 | Steele | Apr. 29, 1958 |

OTHER REFERENCES

"Machinery," August 1931 (page 931). (Copy in Scientific Library and Div. 58.)